(12) United States Patent  
Grove

(10) Patent No.: US 6,645,417 B1
(45) Date of Patent: Nov. 11, 2003

(54) GATELESS MOLDING

(76) Inventor: Dale Grove, 181 Littleton Rd. #214, Chelmsford, MA (US) 01824

( * ) Notice: Subject to any disclaimer, the term of this patent is extended or adjusted under 35 U.S.C. 154(b) by 0 days.

(21) Appl. No.: 09/369,137

(22) Filed: Aug. 5, 1999

Related U.S. Application Data

(63) Continuation of application No. 07/749,989, filed on Aug. 26, 1991, now abandoned.

(51) Int. Cl.[7] .......................... B29C 45/02; B29C 45/28; B29C 45/38
(52) U.S. Cl. ................. 264/328.8; 264/328.9; 264/328.11; 425/562; 425/577
(58) Field of Search .............................. 264/276, 297.2, 264/328.7, 328.8, 328.9, 328.12; 425/129.1, 130, 562, 573, 577

(56) References Cited

U.S. PATENT DOCUMENTS

| | | | | |
|---|---|---|---|---|
| 3,996,330 A | * | 12/1976 | Jones et al. ............... | 264/328.9 |
| 4,091,057 A | * | 5/1978 | Weber ...................... | 264/328.8 |
| 4,171,941 A | * | 10/1979 | Yotsutsuji et al. .......... | 425/146 |
| 4,184,835 A | * | 1/1980 | Talbot ........................ | 425/577 |
| 4,828,769 A | * | 5/1989 | Maus et al. ............... | 264/328.7 |
| 5,460,508 A | * | 10/1995 | Ohno et al. ................. | 425/554 |
| 5,460,763 A | * | 10/1995 | Asai ........................ | 264/328.9 |
| 5,776,407 A | * | 7/1998 | Takeda ..................... | 264/328.7 |
| 5,922,266 A | * | 7/1999 | Grove ..................... | 264/297.2 |
| 5,968,439 A | * | 10/1999 | Grove ..................... | 264/297.2 |

* cited by examiner

Primary Examiner—Angela Ortiz

(57) ABSTRACT

Method and apparatus for forming an article from a molten plasticized resin using an injection molding machine by (a) forming a mold cavity having a first region for producing a molded part and a second, distinctive region for receiving a plasticised resin; (b) injecting into the second region a volume of plasticized resin for the article to be formed in the first region of the mold cavity; (c) applying pressure to plasticized resin to move it at least in part from the second region to the first region; and (d) maintaining pressure on the plasticised resin in the first region until the article is formed and stresses are relieved.

15 Claims, 7 Drawing Sheets

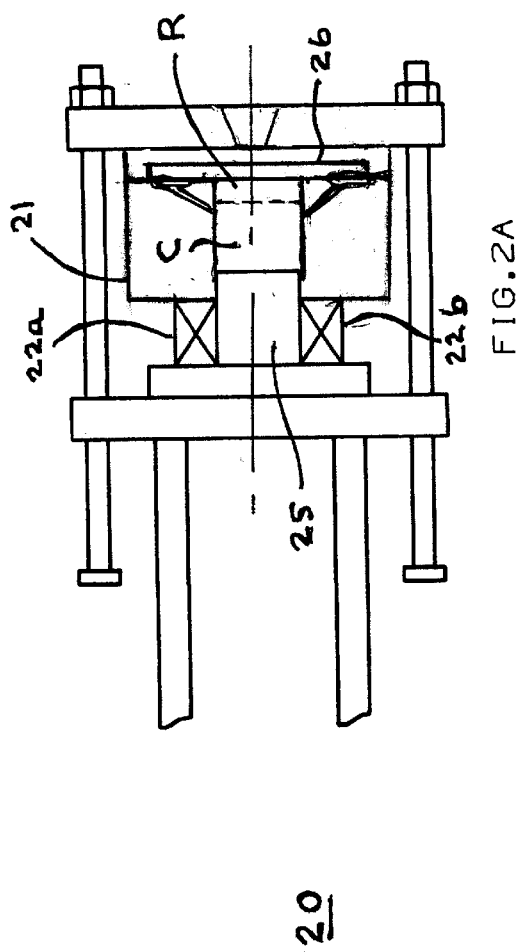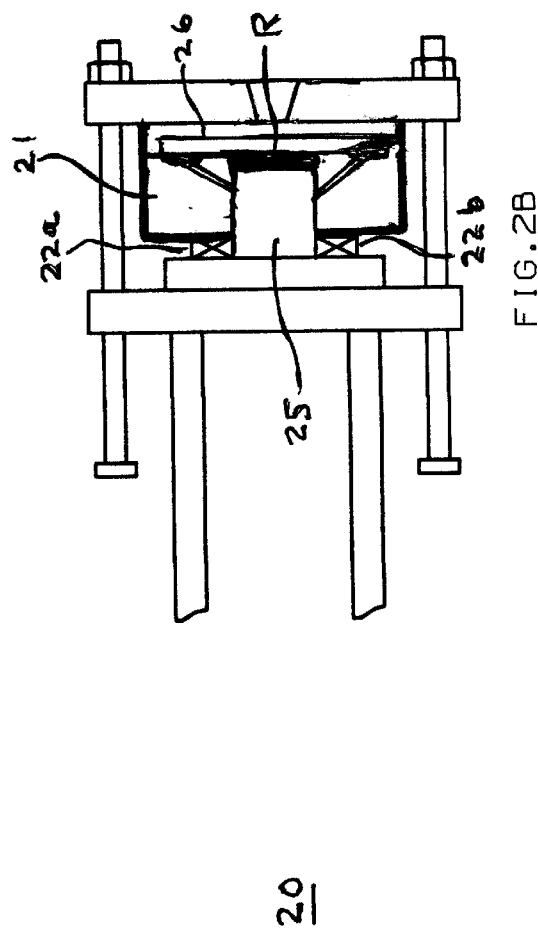

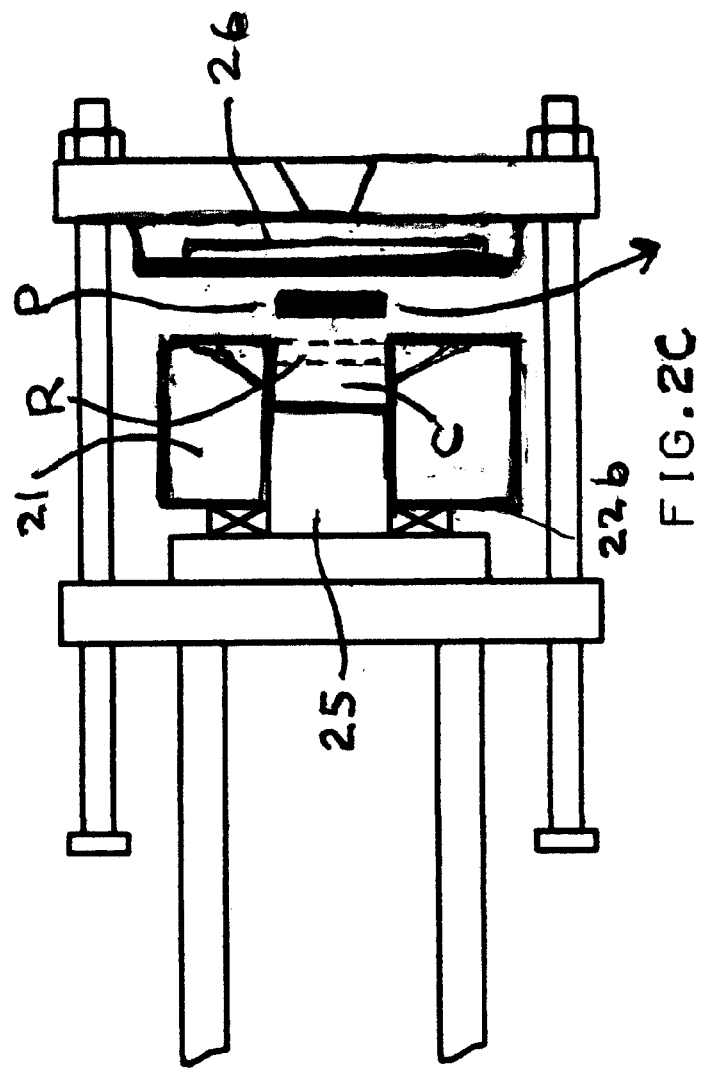

GATELESS MOLDING

This invention is a continuation of application Ser. No 07/749,989, filed Aug. 26, 1991, now abandoned and relates to the injection molding of plastic materials, and more particularly to the injection molding of products with precisely defined surfaces, for which the presence of conventional gating marks would be objectionable.

BACKGROUND OF THE INVENTION

I. Field of the Invention

While the invention is particularly desirable for products with optical surfaces which are free from objectionable defects such as those caused by gate marks, it can be used generally for the molding of thermosetting and thermoplastic materials.

Optical quality products are in wide use. They are needed generally for assays where test substances are subjected to examination by electromagnetic radiation, including visible light. Optical products are also used for instruments, such as microscopes and ophthalmic devices.

Devices that require optical surfaces originally were prepared by grinding glass members. Such products now increasingly employ plastics to expedite manufacture and reduce cost. In general, the demand for plastic optical products is now considerably greater than for glass.

The shift from glass to plastic has occurred primarily because plastic is lighter and often has superior qualities. In addition, protective coatings to provide scratch and abrasion resistance for plastics have become available. Plastic also comes in a wide range of gradient-density tints and colors.

Of the many advantages exhibited by plastics, their relatively light weight and durability have proved to be significant. For optical surfaces, the lens thicknesses are the same for glass and plastic. Consequently, the reduced density of plastic produces a product that is of lighter weight.

The reduction in weight and density is particularly important when high powered surfaces are required, or when large optical surfaces are needed.

Previously, devices with large optical surfaces, particularly those of high power, were typically manufactured by the casting of thermoset resins, for example acrylics that were peroxide cured. However, the availability of polycarbonates and related thermoplastics permits the replacement of cast thermoset plastics. This is because modern polycarbonates have low densities and high refractive indices. For the same optical thicknesses, polycarbonates have an even lower weight than cast plastics, and far lower than glass.

Additionally, since polycarbonates have great impact strength and breakage resistance, they permit the production of relatively thin optical members. Moreover, coatings for polycarbonates are available to provide abrasion resistance. Polycarbonates are particularly suitable for products with "single" optical surfaces, i.e., those with frontal convex and/or backside concave surfaces.

Optical surfaces are defined by two measures of the ray bending power of light or other waves. Spherical power produces magnification and/or reduction, while cylindrical power produces astigmatic corrections. The units of corrective power are in diopters. It often is desirable to have product available with a spherical power in the range from +4 (magnification) to −6 (reduction) diopters, and a cylindrical power in the range from 0 to +2 diopters. Within this range, a volume-frequency distribution can be plotted, centered at zero power. There is reduced frequency in the plot as spherical or cylindrical power increases or decreases.

To be competetive, injection molded products require high yields, with a reduction in scrap and secondary operations, such as trimming.

Additionally, it is desirable to run optical surfaces of differing powers at the same time, without sacrificing productivity, quality or yields. A four-cavity moldset, for example, quadruples the productivity of a particular molding machine. Two of the cavities can be used to mold common spherical and cylindrical power combinations. The remining cavities can be used for less common surfaces.

An illustrative optical surface is found on an optical disk for the laser reading and storage of information. Optical disks for video respond to analog signaling, while compact digital disks are for audio signals. There also is a wide range of computer program disks for information and data storage. These include the CD/ROM (Compact Disk/Read-Only Memory) which is irreversibly encoded with program information, DRAW (Disk Read And Write, i.e. "user write once") and EDRAW (Erasible, i.e. "by the user", Disk Read And Write).

Many disks are encoded during molding by a "stamper", which forms a face surface in the mold cavity. The digital information is represented on the stamper by a spiral of tiny projections, which, in turn, form indentations in the plastic molded disk. A typical indentation has a depth of 0.1 micron and a length of 1–3.3 microns, with a track pitch of 1.6 microns for a spiral array that extends radially outward.

One requirement of high quality molding is intimate contact of the polymer melt with the stamper, without any voids or premature shrinkage. Contact is maintained from the time the cavity is filled with melt until cooling takes place below the glass-transition temperature of the plastic.

Another requirement for optical products is reduction of internal stresses, i.e. "orientation", within the polymer. Ideally, the molding should be "isotropic", i.e., exhibit the same properties in all directions, so that molded stresses and flow induced orientations are eliminated. Such stresses and orientations produce localized differences in ray bending power. The resultant nonuniformities in refractive index are measured in terms of optical path differences, commonly expressed as "birefringence". Avoidance of birefringence is desired.

With surfaces that employ laser signal reading, any flaw which disrupts or deflects the laser beam causes errors. Other properties which require consideration are percentage of light transmission, percentage haze, and the index of discoloration. Localized flaws include opaque specks or clear areas, such as voids or bubbles, which have different refractive indices and optical bending power than adjacent material. Absolute planarity or flatness are often needed where localized warpage would induce prismatic effects and result in off-axis signal transmissions.

In the molding of many optical surfaces it is necessary to conduct operations in clean or "white" rooms. Such rooms provide particle free environments in the range from Class 1,000 to Class 10. Since workers are the biggest source of contamination, automation of handling and post-molding operations is desirable.

Furthermore, for efficiency, microprocessor or CNC (computer numerical control) control should be used. The molding machines also should have individual moldsets, temperature controllers and hopper dryers. A clean air shower is needed for the clamp open and part removal position, together with robotic part pickers.

While optical molding commonly employs a single cavity mold, that makes inefficient use of clean room floor space, and results in a high captial and equipment fixed cost per part. Consequently, it is desirable to produce optical quality parts with multiple cavity molds.

Despite the advantages that have been achieved in the injection molding of optical quality products, there has remained the disadvantage of the product deformity associated with the need for gating the plastic into the mold. At the point of gating the resultant product invariably includes a blemish that requires removal in order for the product to be generally suitable. Typically the removal of the gate blemish takes place by polishing which requires a significant manual effort and additional cost.

II. The Prior Art (a) Straight Injection Molding

Early attempts to make acrylic or polycarbonate optical parts used injection molding with the mold cavity surfaces fixed throughout the molding cycle. This required long cycles, high mold surface temperatures approaching the glass-transition temperature of the plastic, along with high plastication and melt temperatures. Slow, controlled fill rates were followed by high packing pressures, which were held until the completion of gate, freeze-off.

Fixed cavity processes employ large gating and runner systems to permit appreciable packing pressure and delivery of material before gate freeze-off occurs. At that time no further transfer of molten polymer occurs. Gate freeze-off in fixed cavity injection presents a problem with surfaces having differing radii of curvature. It is the differences in curvature that produce the necessary ray bending needed for optical surfaces. Differing cross-sectional thicknesses result in non-uniform shrinkage during part formation and subsequent cooling. The thickest sections of optical parts are subject to sink marks or depressions which interrupt an otherwise uniform surface. This results in localized aberrations in ray bending character.

Even when care is taken that the injected polymer conforms to the surface of a fixed mold cavity, once gate freeze-off occurs, that prevents additional packing pressure and material transfer. This usually takes place in the thinnest cross-sectional area of the part, and differential shrinkage begins to occur within the melt. The polymer skin then pulls away from the mold surface, with greatest effect in the thickest cross sections. Pre-release, whether partial or complete, of the molded plastic before the cavity is unlocked and opened, detrimentally affects optical quality. The molded contours no longer provide precision surfaces.

Similar problems occur in the straight injection molding of parts with high aspect ratios, i.e., where there are relatively large surface dimensions and relatively small thicknesses. In those cases, a long length of flow is required through a small cross-sectional orifice of the mold cavity.

(b) Polymer Resins

The most widely used polymers for the molding of parts with optical surfaces are polycarbonates and thermoplastic acrylics, particularly polymethyl methacrylate (PMMA).

Acrylics inherently have better flow at low melt temperatures, as well as low birefringence or polymer disorientation. However, they have relatively high water absorption which results in swelling and warpage, and relatively low creep resistance. Susceptibility to heat distortion make acylics less desirable, except for products, such as video disks, where parts are cemented together with encased information.

Polycarbonates, on the other hand, can have better performance, but are subject to serious processing limitations. Ordinary grades of polycarbonate have a low melt-flow index range, but higher melt-flow grades are available.

Even with high flow grades, the straight injection of polycarbonate causes high birefringence. This is because the mold cavity has fixed dimensions which do not change during the molding cycle, and exceed the finished part by a shrinkage compensation factor.

Polycarbonates are in amorphous chains that form random coils when in a relaxed state. When polycarbonate melt is forced through a restrictive flow path, or orifice, by high injection pressures the polymer distorts from stretching and shearing, realigning the polymer chains so that they are parallel to one another. This is believed to create severe anisotropy, i.e., nonuniformity. The incoming melt front can be regarded as a dynamically stretching zone of molten polymer. In this frontal zone, disorientation is caused by the shear of one polymer layer over another. This is a result of unavoidable velocity differences because the center of flow is faster than at the edges. In the resulting velocity profile, the lowest velocities are at the mold surface, and the highest velocity is at the center. A slowly moving melt front, at low pressure, produces a front that is less distorted and less stressed.

In straight injection molding of polycarbonates, injection is at the highest speed of the hottest, most fluid, polycarbonate melt into the narrow constrictions of a fixed cavity mold.

Elaborate plastication is needed to provide the hottest melt without catastrophic degradation in straight injection molding. Being less viscous, a hot melt provides less internal shear and slower freeze. This allows more time for melt relaxation after flow ceases, and before solidification. Such plastication can use starved feeding or a reduced sized barrel/screw combination. This minimizes the residence time of the polycarbonate polymer in the injection plastication unit, since high melt temperatures are required. Some plastications cause high shearing of the melt and suffer more polymer degradation.

The balance between degradation flaws—from a hot plastication melt—and high disorientation—from a fast fill rate into a high aspect ratio and restrictive mold cavity, creates a narrow "process window". This has made straight injection suitable only for single cavity molding. Multiple cavity straight injection would result in cavity imbalance.

Another difficulty with straight injection is that the contents of the mold cavity gradually shrink during cooling. This causes the part to pull away from the mold surfaces. Premature release can produce differential warpage or imprecise replication of surface contour patterns. Straight injection uses high injection pressures to maintain cavity pressure until gate freeze-off occurs. However, this application of pressure also causes re-extrusion or cold-flow of the increasingly viscous polymer core within the fixed dimensions of the mold cavity. Such forcible redistribution of the partially-solidifying melt creates internal stresses resulting in birefringence.

(c) Molding By Compression After Injection

To overcome the difficulties associated with straight injection, resort has been made to mold cavity compression after injection. There are three types: (1) clamping with injection followed by compression, where compression is by platen motion; (2) auxilary component injection followed by compression, where there is full machine clamping with no platen motion, and mold-cavity compression is by auxilary components internal to the moldset; and (3) clamping and auxiliary component compression following injection, where mold cavity compression is by clamping and auxiliary component motion.

(C-1) Clamping With Injection Followed By Compression

Martin U.S. Pat. No. 2,938,232

As disclosed in Martin U.S. Pat. No. 2,938,232 ("Martin '252") for toggle-clamp injection molding, issued May 31, 1960 and known as a "sandwich press", the mold platens and mold halves are brought together until a predetermined air gap is present at the parting line. At that point, a low pressure, low velocity injection fill begins.

After injection is completed and the molten polymer mass has cooled for a predetermined interval, the machine commences closure of the movable platen. This mechanically seals the mold cavity and its partially solidified contents with zero-clearance at the parting line. The mold halves are locked for the duration of the molding cycle at a predetermined clamp pressure. The partially solidified polymer mass is compressed by the amount of the air gap that existed at the parting line when injection started. By eliminating the air gap, the volume of the cavity and runner system is proportionately affected, resulting in compressive forces exerted upon the partially solidified polymer and causing a reorientation and re-flow. Under clamp induced compressive force, the mold cavity contents continue cooling and solidifying, eventually reaching a temperature sufficiently below the glass-transition temperature that the molded part may be ejected without optical distortion.

The result is clamp induced "coining" which offers advantages over straight injection. Successful coining is a function of initial injection pressure and fill rate, air gap dimensions, the timing interval between injection and compression, and the magnitude of the final clamping forces.

Control over injection pressure and fill rate, along with timing are critical. In order to prevent molten polymer from spilling outside the mold cavity, the injected melt must form a surface skin and partially solidify. Otherwise, molten polymer spills into the air-gap and necessitates trimming of the molded part.

If the melt has solidified excessively, compression at ultimate clamping pressures can cause deformation at the parting line and damage the moldset. The cooling interval is critical to achieving acceptable yields. If the melt is not sufficiently solidified at its most constrictive point, partially molten polymer can be extruded out of the cavity and into the runner system. This can result in an underfilled and underpacked part with badly distorted surfaces. However, if compression is delayed too long, too much polymer solidification will occur when the compressive force is initiated. This results in forceable reorientation of the polymer and "cold working" of the plastic, producing birefringence and undesirable molded-in stresses.

Bartholdsten U.S. Pat. No. 4,409,169

To alleviate these problems of Martin '232, Bartholdsten et al U.S. Pat. No. 4,409,169 teaches a slow, low-pressure injection of an oversized shot into a mold that is partially-open at the parting line, followed by deliberate melt cooling, viscosity thickening and a short pressing stroke to squeeze from the reduced mold cavity volume the partially cooled and viscous excess Aplastic. As pressing continues to the fully closed parting line position, radially extruded overl flow is pinched. Full clamping is maintained for shrinkage compensation and avoidance of prerelease.

Matsuda U.S. Pat. Nos. 4,442,061 and 4,519,763

Another clamp induced coining process is disclosed by Matsuda et al in U.S. Pat. Nos. 4,442,061 and 4,519,763.

Melt is injected into a slightly opened moldset and cooled until fully solidified. The melt is then reheated uniformly above the melt temperature, at which point a clamp actuated compressive stroke is delivered and maintained throughout a second cooling cycle.

(C-2) Auxiliary Component Injection Followed By Compression

Another type of injection followed by compression molding makes use of auxiliary components, such as springs or cylinders to apply compressive force to internal and opposing mold surfaces. The primary difference over clamping injection/compression is that mold compression is provided by a stroke producing element, whereas mold compression in auxiliary component" molding is provided by auxiliary springs or hydraulic cylinders. Furthermore, clamping injection followed by compression is sequenced and coordinated by process control, while auxiliary component compression is controlled by self-action, like springs, or separately by timers.

A further distinction is that auxiliary component compression does not employ the motion of a movable platen to provide compressive forces to reduce cavity volume. Instead the mold is fully clamped with no relative motion of the clamp plates, or of fixed and movable platens, during the injection fill, cavity reduction compression, or cooling.

Examples of auxiliary component injection followed by compression are discussed below.

Johnson U.S. Pat. No. 2,443,286

In Johnson U.S. Pat. No. 2,443,286, issued Jun. 22, 1948, spring loaded, movable dies are employed within the moldset. This creates a variable volume mold cavity, but relies upon high internal polymer melt pressure to spread the movable dies against resisting spring pressure. In order to apply a sufficiently great compressive force to the solidifying contents, substantial spring forces are needed. However, the greater the spring force, the greater the injection pressure needed to compress the springs during variable cavity fill. The greater the injection pressure, the greater the degree of molded-in stress and unsatisfactory birefringence. This type of process generally is limited to production of weak optics with small surfaces and limited thickness.

Weber U.S. Pat. Nos. 4,008,031 and 4,091,057

Another auxiliary component process is disclosed in Weber U.S. Pat. Nos. 4,008,031 and 4,091,057. A variable volume cavity is formed by injection melt and by the pressure induced rearward deflection of at least one movable die. After an interval, forward displacement results in compression under the driving force of an auxiliary hydraulic cylinder mounted in a one-to-one relationship with the movable die. Flow ports are provided for excess, increasingly viscous and partially cooled injected polymer melt which is extruded from the cavity under compressive forces.

Weber teaches slow mold fill, and, as with conventional clamp induced coining, relies upon a preset lapse of time between completion of injection fill and commencement of compressive pressure. Accordingly, Weber is faced with the problems of premature compression, i.e., inadequate solidification, or delayed compression, i.e.,late solidification.

In addition, Weber can produce inconsistent parts with variable thicknesses. Depending upon the timing interval, the travel of the movable die is controlled by the length of time elapsing after molten plastic enters the variable cavity and pressure is applied to the movable die. The final volume of the cavity also is controlled by the time elapsing after molten plastic enters the variable cavity, and by the length of time that pressure is applied to the movable die. The result is product variation within the same production run, and thickness variations.

Moreover, when Weber employs a two cavity mold the compression of each cavity is controlled by a separate and independent hydraulic cylinder. Consequently, the two cavities are not simultaneously acted upon by a common component. The larger the number of cavities, the larger the expected variations.

Laliberte U.S. Pat. No. 4,364,878

Another auxiliary component process is disclosed by Laliberte in U.S. Pat. No. 4,364,878. Laliberte includes a movable die coupled to an auxiliary hydraulic cylinder. After the mold is closed under clamp pressure, the mating die parts are spread apart. A precise, volumetrically metered shot that is just adequate to fill the fully-compressed mold cavity is then injected. This control of shot size allows compression without displacement of partly solidified melt out of the mold cavity through an overflow port. The result is greater control over part thickness, eliminating scrap waste and trimming.

However, Laliberte is limited to one-cavity production by reliance upon precisely metered melt, corresponding one-to-one with the injected melt. In addition, there is dependence upon an individually controlled and sequenceable hydraulic cylinder in a one-to-one motion relationship with a variable volume cavity.

While auxiliary component processes have to some degree been useful in molding optical surfaces, they cannot be applied generally.

Compressive forces for auxiliary component molding are much less than those available through clamp actuated coining. This limitation is particularly troublesome for optical surfaces with large projected areas and the necessity for initimate contact with the melt.

(C-3) Clamp and Auxiliary Component Injection Followed By Compression

Maus & Galic U.S. Pat. No. 4,828,769

Another prior art technique with clamp and auxiliary component injection followed by compression is disclosed in U.S. Pat. No. 4,828,769 which issued May 8, 1989 to Steven M. Maus and George J. Galic. According to this teaching, an article is formed from a plasticized thermoplastic resin using an injection molding machine in which an opposing pair of mold inserts are initially separated to form a pre-enlarged cavity.

A mass of plasticized resin, slightly larger than the volume of the article to be formed, is injected into the mold cavity. The main clamp force of the injection molding machine is initiated, shortly before completion of the injection to overcome inertial effects. After the completion of injection, compression begins and the clamping reduces the volume of the closed mold cavity in order to redistribute the resin. The main clamp force is applied until a final clamp lock position is reached.

In addition, the molding machine has first and second mold platens, first and second parting line mold plates, a plurality of first mold inserts operatively disposed within a mold plate forming a first parting line, and a plurality of second mold inserts operatively disposed within a mold plate forming a second parting line. The first and second mold plates, and the first and second mold inserts, are respectivly commonly supported by the first and second mold platens. The mold plates initially are urged together to eliminate any parting line air gap.

D The General Unsuitability of the Prior Art

In all of the prior art discussed above, the product has been accompanied by inevitable gating marks. These marks not only produce an undesirable disfiguration of the product, they interfere with its optical and radiation transmission performance. To date there has been no successful technique for the elimination of gating marks, whether the gating deformitites were produced by a cold runner system with a subgate leading from the cold runner to the mold cavity, or whether by a hot runnner system in which a melt stream is applied to the cavity through a short thin neck that hardens when the part is formed. In all cases the removal of the part from a cavity entails the severance from the short thin neck of the runner system or the severance from the subgate connection of the cold runner system.

III. Objects of the Invention

Accordingly it is an object of the invention to expedite the molding of articles, particularly those which have optical surfaces.

Another object is to overcome the difficulties associated with prior art straight injection, clamping injection, and auxiliary component injection, and injection-compression parting line molding where compression of melt takes place after injection is completed.

A further object of the invention is to eliminate the deformities and defects associated with conventional gating.

SUMMARY OF THE INVENTION

In accomplishing the foregoing and related objects, the invention provides a method of forming a gateless article from a molten plasticized resin using a molding machine which forms a mold cavity having a first region for producing a molded part and a second region for receiving a plasticized resin. A volume of plasticized resin is injected into the second region for the article to be formed in the first region of the mold cavity. Pressure is then applied to the plasticized resin to move the resin at least in part from the second region to the first region. Pressure is maintained on the plasticized resin in the first region until the article is formed and stresses are relieved.

In accordance with one aspect of the invention, the first and second regions of the mold cavity are formed with respect to a movable mold insert and/or a mold member for receiving the insert. Pressurization takes place with or after the completed injection of plasticized resin into the mold cavity to reduce the volume thereof to the first region and fill the first region while driving gasses therefrom. The insert is displaced within its mold member while the mold cavity is closed and is displaced below the second region during the injection of the plasticized resin.

The article is formed with a boundary at the parting line or interface between mold parts. The injection of the plasticized resin takes place through a plurality of orifices which direct the plasticized resin into the second region.

The machine advantageously has fixed and movable platens mounting the insert and an opposing mold member, at least one of which is capable of movement relative to the other. The insert is initially separated within its mold member to form a pre-enlarged cavity for receiving resin with reduced back pressure. The injected resin is through a sidewall of a mold member housing a movable insert and through a subgate into said second region of the mold cavity and through the neck of a hot runner system.

Apparatus for forming a gateless article from a molten plasticized resin includes members for forming a mold cavity, with a first region for producing a molded part and a second, distinctive region for receiving a plasticized resin. Injection into the second region is of a volume of plasticized resin for the article to be formed in the first region of the mold cavity. Pressure is applied to the plasticized resin to move the resin at least in part from the second region to the first regions, and maintained on the plasticized resin in the first region until the article is formed and stresses are relieved.

The cavity can be formed by a first mold member affixed to a first mold platen, and a second mold member with an internal, movable insert affixed to a second mold platen. The insert is surrounded by a movable mold member which engages the first mold member to form the first and second mold cavity regions. A main clamp force controls the position and velocity of the insert relative to the mold member. The insert has an initial stroke to close the gate by which resin is injected into the mold, followed by a stroke beyond the gate to compress the resin and compensate for cooling-induced shrinkage. A gate for the injection of resin into the mold extends along the parting line between the mold members.

The invention also is directed to simultaneous injection and pressurization molding which is particularly useful in producing, for example, optical quality products at high output yields and reduced cost.

One method includes forming an article from a plasticized resin by an injection molding machine that uses a die with a moveable insert. A closed mold cavity is formed for receiving plasticized resin. A mass of plasticized resin, equal or larger than the mass of the article to be formed, is injected into the mold cavity. Simultaneously with the injection of melt, the insert is withdrawn to increase the volume of the closed mold cavity and permit the introduction of melt without introducing significant backpressure.

The invention also includes the formation of a multiplicity of articles simultaneously from plasticized resin.

In accordance with one aspect of the invention, a homogeneously plasticized polymer, such as a polycarbonate, acrylic, polymer styrene, ABS (acrylic styrene) or EKTAR (a Kodak copolymer of polycarbonate and styrene), is prepared in a reciprocating screw injection molding machine that is equipped with process controls, preferably an open or closed loop microprocessor, or conventional molding machine controller.

A reciprocating screw delivers a precisely-metered volume of melt, greater than or equal to the total mass needed to form parts, for example, by a runner system connected in fluid communication with mold cavities and a nozzle source.

In accordance with another aspect of the invention, a variable volume cavity is created by insert movement. During injection fill from a plurality of injection ports, the volume of the cavity is progressively increased until the volume is greater than the volume of the resulting finished article. The volume of the injected mass also is greater than that of the finished article to compensate, upon completion of cooling, for shrinkage and subsequent demolding.

In accordance with another aspect, the injection of resin occurs at a relatively high fill rate, but, because of the variable volume cavity, the injection is at reduced pressure at entry points of the cavity. This reduces resulting molded-in stresses and internal strains in the molded part.

In accordance with a further aspect, the pressurization of the melt is initiated with the insert retracted. The stroke can be profiled using sensors, such as those associated with screw position, even before the screw has actually begun its travel, and before and during subsequent full delivery of the predetermined injection shot size. Early sensing, even before injections, compensates for the inherent inertia in commencing actual pressurization travel of the movable platen.

The melt pressurization is monitored in accordance with further motion of the movable platen, but other machine elements, such as the ejector, could be used instead. Changes in position and velocity are determined by numerically controlled clamp profiling, for example using an opened or closed loop microporcessor, or conventional molding machine process controller. The pressurization can be "single stage" in which increasing back pressure of the melt progressively slows the pressurization stroke. Preferably the pressurization is multi-stage, with at least one relatively fast phase and one relatively slower phase. The faster phase helps displace any void volume or gas in the oversized cavity and quickly commences pressurized redistribution of the relatively hot, minimally solidified thermoplastic mold cavity contents into its preferred isotropic orientation. This assures intimate contact with precisely polished mold surfaces, to produce the desired molded part configuration. The last stage of the multi-stage pressurization proceeds at a comparatively slower travel and is largely used to maintain intimate contact between the cooling and shrinking polymer mass and the mold surfaces to avoid prerelease and optical distortions.

A multistage pressurization can include any number of intermediate steps, but preferably includes at least one relatively fast travel step, followed by a relatively slower travel step. This is to maintain molded part shrinkage control throughout the cooling process until the the molded part is well below its glass transition temperature and ready to be ejected.

In accordance with still another aspect of the invention, following multistage pressurization and gradual cooling of the polymer, solidification and cooling are completed to the point where the molded parts can be ejected from the mold. At that time the core is retracted to its fully withdrawn position and conventional ejection is employed. Meanwhile, during cooling, the plasticating screw is prepared and metering takes place for the next shot to be delivered on the next molding cycle.

Where the same driving force is used for pressurization, all cavities in a multicavity mold will receive the same pressurization forces at the same time.

Cavity filling desirably takes place at low injection pressures, but the process is not dependent upon commencing pressurization at a preset time interval, with an inherently high level of error, but rather pressurization is determined with comparative precision by sensing a digitally settable screw position using a controller.

The method of the invention also forms a gateless article from a material using a molding machine by (a) forming a mold cavity having a first region for producing a molded part and a second, distinctive region, including a gate, for receiving the material; (b) injecting into the second region through the gate a volume of the material for the article to be formed in the first region of the mold cavity; and (c) applying pressure to the material to move it beyond the gate from the second region into the first region so that the article does not have any gating marks.

Force is maintained on said the members until the article is completely formed without gating marks.

The volume of the second region can be controlled by a movable insert of the machine, and the insert can be displaced within the mold cavity while it is completely closed, for example, displaced below the gate during the injection of the material, which can be injected through a plurality of gates.

The gates can terminate in diagonal channels for the injection of the material, and the mold can have a parting line in the first region. The injection can be through a sidewall of the mold cavity and be injected through a an edge-gate for a hot runner, or through the neck of a hot runner, with the material being a plasticized resin.

DESCRIPTION OF THE DRAWINGS

Other aspects of the invention will become apparent with reference to the drawings that depict several illustrative embodiments of the invention, in which:

FIGS. 2A through 2C are diagrams showing stages of operation for the clamp assembly and cavity control mechanism for the gateless injection and pressurization system of FIG. 1;

Apparatus of the invention for forming a gateless article from a moldable material can include a mold cavity having a first region for producing a molded part and a second distinctive region for receiving the moldable material through a gate; and injection through the gate into the second region of a volume of material to be molded in the first region.

The cavity can be formed by a first member in contact with a first platen and a spring-loaded second member mounted on a movable platen and surrounding an insert mounted on the movable platen.

The method of forming a gateless article from a material using a molding machine having first and second mold platens, can include the steps of (a) forming a mold cavity having a first region adjoining a second region containing a gate for the injection of material into the second region; (b) injecting into the second region a volume of material through the gate; and (c) forcing the material from the second region into the first region beyond the gate so that material forced into the first region does have any gating marks.

The injection of material can be through a sidewall of the mold cavity or through a an edge-gate.

The material also is injectable through the neck of a hot runner and can be a plasticized resin.

DETAILED DESCRIPTION

The following description is merely illustrative of the invention, the scope of which is limited only by the appended claims. Other embodiments will be apparent to those of ordinary skill in the art.

Figure 1:
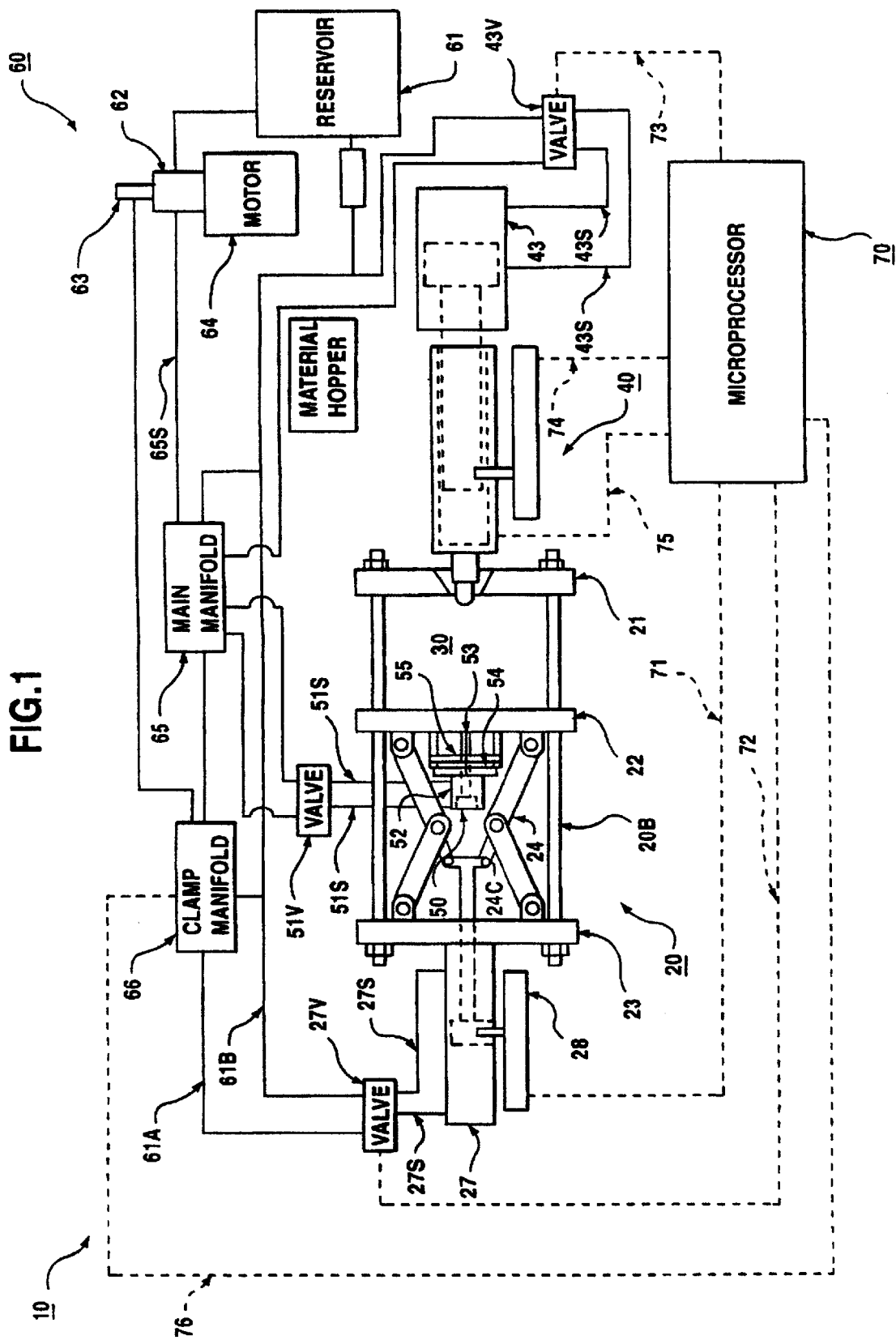
FIG. 1 is a diagrammatic view of an overall system for gateless injection and pressurization according to the invention.

I. Illustrative Overall System With reference to the drawings, FIG. 1 illustrates a molding system 10 for producing, in accordance with the invention, gateless parts that can have thin-walled optical quality.

The major components of the system 10 are a mold cavity control arrangement 20 (illustrated in FIGS. 2A through 2C); a platen and pressurization mechanism 30 for molding gateless products; a plasticizing and injecting unit 40 for the mold cavity; an optional ejector assembly 50 for the molded parts; a hydraulic system 60 for operating the various components; and an overall system controller 70.

The platen and pressurization mechanism 30 is formed by platens 31 and 32, and a pressure plate 33 that is operated by a hydraulic cylinder 37.

The platens 31 and 32 embrace and act against a moveable core 25 and a mold member 26 (FIGS. 2A through 2C); with respect to a mold cavity C formed between the core 25 and the member 26.

The cavity control arrangement 20 governs enlargement of the mold cavity C in preparation for receiving a shot of plastic melt, and is thereafter able tooperate in conjunction with the pressurization mechanism 30 to reduce the size of the mold cavity.

The plasticizing and injecting unit 40 is responsible for preparing and injecting a shot of melt that is substantially equal or larger in volume than that of the finished part.

The ejector assembly 50 is optional and may be used to assist in clearing the mold, once the molded part has been formed and cooled below the glass transition temperature of the injected plastic.

The hydraulic system 60 supplies fluid for the operation of the various hydraulic components used throughout the overall system 10.

All components are coupled directly or indirectly to the controller 70, which is responsible for synchronizing the operations of all components in the overall system 10. The major components and their operations are described below.

(a) The Platen and Pressurization Mechanism 30

With reference to FIG. 1, the mechanism 30 includes platens 31 and 32, which are operatively connected to a hydraulic actuation system. A pressure plate 33 is joined to, and actuated by a piston rod 37r of the hydraulic cylinder 37. The pressure plate 33 is in turn joined to the movable platen 32 upon which the core 25 is mounted. In the cavity arrangement (FIG. 2A), a spring loaded frame 21 surrounds a moveable core 25 that acts with respect to a mold member 26. Spring loading of the frame 21 is by spring members 22a and 22b.

The pressurization mechanism 30 acts with the cavity control arrangement 20 to form the mold cavities which receive the melt generated in plasticizer unit 40. The hydraulic acutation system includes a hydraulic cylinder 37 which responds to hydraulic fluid supplied by a control valve 37v through hydraulic lines 37s. Control valve 37v is itself controlled in a similar manner to a valve 43v of the melt injector 41.

The valve 37v is actuated by the controller 70 which receives feedback indicative of plasticizer piston position from a transducer 38. Signal path 71 couples the control system 70 with transducer 38, whereas signal flow path 72 interconnects valve 27v and controller 70. High pressure hydraulic oil is supplied to valve 37v by a line 61a, and line 61b provides a hydraulic return. A conventional electric motor/pump system provides oil at the necessary pressure and flow rate. Valves 43v and 37v are preferably ratio and proportion valves. Such valves are available from Rexroth Corporation, Bethlehem, Pa. Transducers 38 and 44 can be a DCTM Linear Displacement Transducers from Temposonics Corporation of Plainview, N.Y.

The hydraulic mechanism 30 can be the hydraulic pressurization portion of a Computer Numerically Control (CNC) controlled injection molding machine. Such machines can control injection using fast responding servo or cartridge valves and steppable or variable volume pumps. Alternatively, digital control can be exercised over position and motion/velocity profiles of hydraulic machines.

(b) Cavity Enlargement Mechanism 20

The cavity enlargement mechanism 20 functions to selectively enlarge the mold cavities so that melt can enter without encountering significant flow resistance or back pressure. In addition, the cavity C, as shown in FIGS. 2A–2C, is adapted for gateless molding by having a plastic runner drop 27d communicate with the cavity C below the reduced cavity R that governs the size of the molded part. The showing in FIGS. 2A–2C is for a hot runner system, but it will be appreciated that the invention is operative for other runner systems as well, including the cold runner system discussed below in conjunction with FIGS. 4A–4C.

With Reference to FIGS. 2A through 2C, the cavity enlargement system 20 also includes a movable frame 21 which is supported by resilient members 22a and 22b.

Alternatively, a hydraulic system could be employed with a three-way solenoid connected to the controller 70 by a signal path. Under the command of the controller 70, the three-way valve could provide hydraulic fluid to the set of resilient members 22a and 22b.

The resilient members 22a and 22b are operatively mounted with respect to the moveable platen 32 as shown in FIG. 2A. The particular construction of the frame 21 and the members 22a and 22b avoid the conventional mold parting line.

Where a valve is employed with the members 22a and 22b, it supplies fluid to the members 22a and 22b while simultaneously providing any necessary venting. The resilient members 22a and 22b can be compression springs with high elastic moduli. Preferably, however, the resilient members 22a and 22b are hydraulic cylinders which can be selectively extended upon receiving hydraulic fluid from their valve. The purpose and operation of the resilient members 22a and 22b are further described below.

(c) The Plasticising and Injection Unit 40

The plasticizing and injecting unit 40 is suitable for preparing a homogeneously-plasticized polymer, such as a polycarbonate or acrylic. The unit 40 preferably includes a barrel and screw plasticizer 41 of the type used in conventional injection molding machines. However, for optical molding, melt homogeneity, i.e., absence of solid polymer particles, and thermal uniformity, i.e., relatively constant temperature variation from start to end of shot delivery, are desired. Accordingly, the plastication units of conventional injection machines are usually modified by using downsized barrel and screw cominations, special screw designs employing controlled shear or melt barrier features, starved feeding of pellets, melt reservoir or accumulator stages. Such modifications are suitable in the practice of the invention.

The barrel and screw plasticizer 41 receives polymer pellets from a hopper 42 and is actuated by a hydraulic cylinder 43. Extension and retraction of the cylinder 43 are controlled by hydraulic fluid supplied through lines 43s by a valve 43v, which in turn is operated by the controller 70 through a signal path 73. Feedback to controller 70 is indicative of piston position provided by a transducer 44, as discussed below.

The plasticizer/injector unit 40 precisely accumulates and delivers the desired volume of plasticized melt. This ban be achieved with a reciprocating screw injection unit that has a digitally settable and readable screw position, with plasticized melt being accumulated ahead of the screw tip in preparation for injection of the next shot. Screw position is preferably monitored using the transducer 44 which can be a potentiometer, a linear displacement transducer, or an optical encoder. The transducer 44 can be a Series DCTM Linear Displacement Transducer from by Temposonics Incorporated, Plainview, N.Y. The output of transducer 44 is delivered to the controller 70 through a signal path 74. As explained below, when the tranducer 44 signals that the injection of melt to the mold cavities has commenced, the pressurization portion of the process can begin.

The injection fill rate is preferably high in comparison to prior art fill rates for coining or injection molding followed by compression, and desirably is digitally settable and profileable. A wide variety of commercially available injection molding machines, including those designated as CNC (Computer Numerical Control) offer such process-control features.

(d) Ejector Assembly

The molding machine also can include a hydraulically actuated ejector assembly to assist the ejection achieved by the spring-loaded frame 21. When the ejector assembly 50 is employed, as shown in FIG. 1, it includes a ratio valve 51v which is the functional equivalent of valves 37v and 43v. Hydraulic lines 51s from valve 51v feed a double-sided hydraulic ram 52 which actuates pin 53 slideably disposed in relation to a mount housing 54 and the movable platen 32. The mount housing 54 in turn is connected to and actuates a push bar 55 which extends through the movable platen 32 and acts on components internal to the mold to effect part ejection. The valve 51v is connected by signal flow path 75 to controller 70, and controller 70 activates it to eject the finished parts.

(e) Hydraulic System

A conventional hydraulic'system 60 supplies pressurized fluid to the ratio valves 37v and 51v. The hydraulic system includes an oil reservoir 61 coupled to a relatively low pressure, high volume pump 62 and a relatively high pressure, low volume pump cartridge 63. The pumps 62 and 63 are commonly driven by an electric motor 64.

The high volume pump 62 feeds a passive manifold 65 by a line 65s. The passive manifold 65 in turn distributes the low pressure hydraulic fluid to an active manifold 66 and the control valve 37v. The active manifold 66 also is supplied with high pressure hydraulic fluid by high pressure pump 63, and is connected by signal flow path 76 to controller 70. The controller 70 can signal the manifold 66 to supply either high pressure, low volume oil or low pressure, high volume oil to the control valve 37v. This is to precisely profile the application of clamp pressure. Whereas conventional injection molding machines do not make large demands of hydraulic pressure, and flow simultaneously at both injection and clamp ends (cylinders 43 and 37). Pressurization clamping force and motions commence with the commencement of injection fill. In order to thus satisfy the hydraulic requirements of both cylinders 37 and 43 at any point in the process sequence for hydraulic fluid volume and pressure, the clamp manifold 66 is desirably added, working in combination with the main manifold 65 and pumps 62 and 63. Manifold 66 thus supplements, and isolates as needed, the clamp cylinder 37 and valve 37v from the main hydraulic circuit and manifold 65. The a exhausts of valves 37v and 43v, and manifolds 65 and 66 are connected to a conventional hydraulic oil heat exchanger 67 which in turn is connected to the oil reservoir 61.

(f) Controller 70

The controller 70 is coupled, directly or indirectly to and controls the position and velocity of movable mold platen 32 through control of valve 37v and active manifold 66. It also controls the operation of plasticizing/injecting unit 40. It preferably controls the temperature of the moldset and the parts ejection mechanism, as further described below. The controller 70 could have a large variety of forms, including hydraulic, mechanical or pneumatic. The preferred controller 70 includes electronic circuitry. A hard wired or programmable CNC injection molding machine could be used to accomplish the various tasks assigned to controller 70. The program for a programmed control system should respond to digitally settable operator input values for position, time, velocity, pressure temperature, and settable sequences or modes. It also transmits information thru control signal paths 71–76, as well as respond interactively to real time measurements of the parameters, by comparing measured values from sensors such as 38 and 44 against desired values.

Additional but optional functions of controller 70 include memory or data storage, presentation of actual parameter values in real time by CRT (Cathode Ray Tube) display, compilation of production data into formats for supervisory review, and transmission or reception of electronic manifestations of data or parameter values through an on-line network or electronic linkage between equivalent machines and/or a hierarchial control/reporting supervisory terminal.

The controller 70 includes, but is not limited to factor-installed and field-retrofit CNC (Computer Numeric Control) or a microprocessor-controlled molding machine process controller. A number of such controllers, are commercially available for toggle and hydraulic type clamp machines. A representative controller 70 is the CAMAC XT Serias controller available from Cincinnati Millicron company of Cincinnati, Ohio.

II. Alternative Overall System

Figure 3:
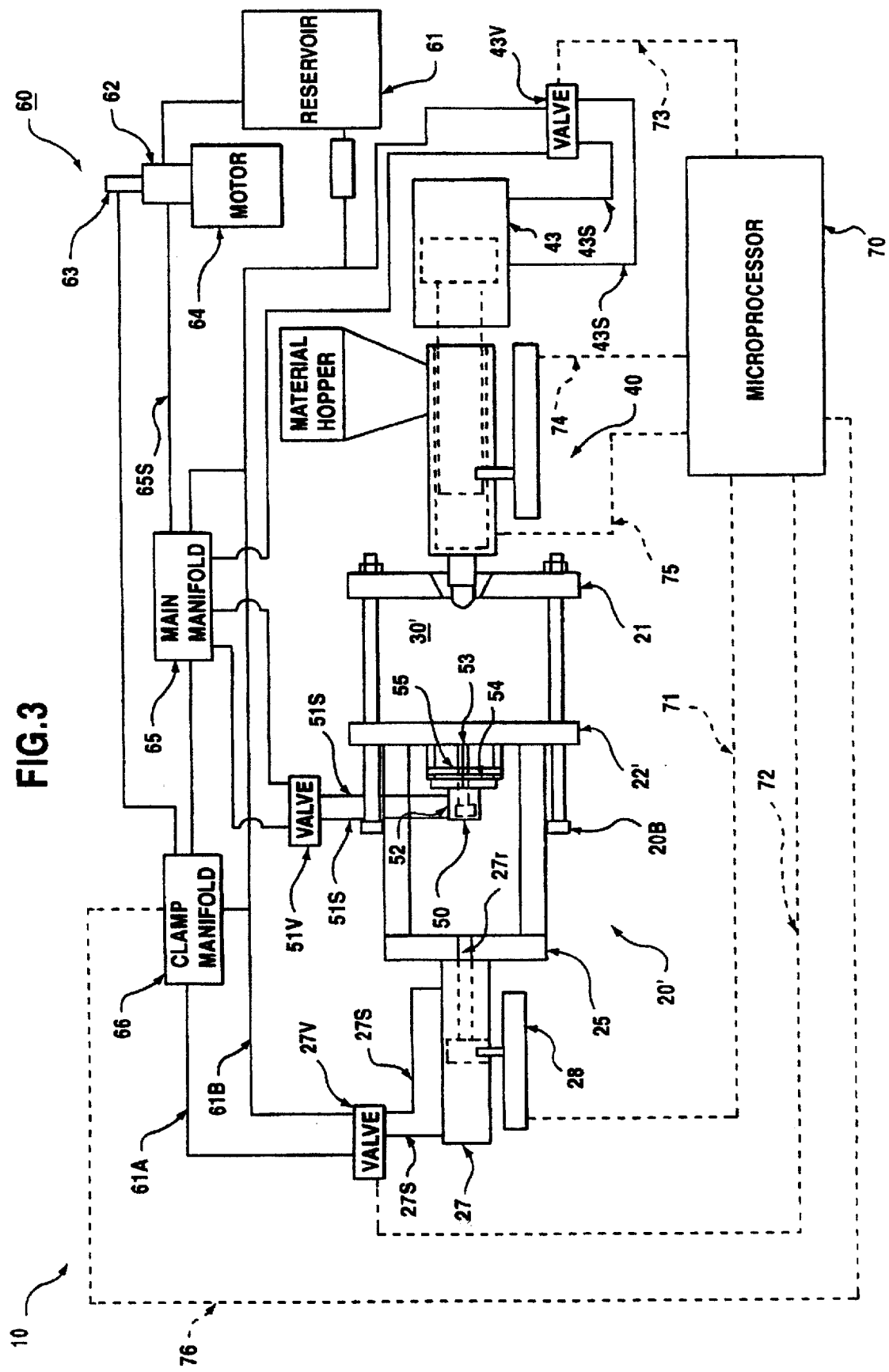
FIG. 3 is a diagramatic view of an alternative overall system for gateless injection and pressurization according to the invention.

An alternative overall system in accordance with the invention is shown in FIG. 3. The hydraulically operated mechanism 30 of FIG. 1 has been replaced by a clamping mechanism 30'. The ratio of hydraulic cylinder motion to movable platen motion in hydraulic clamp machines generally is one-to-one, whereas a toggle machine gives a mechanical leverage advantage of 1:16–20. Thus, the positional error of a digitally-settable and trackable hydraulic cylinder is correspondingly reduced in the case of a toggle clamp machine, but can be 1:1 in a hydraulic machine. Furthermore, the mechanical clamp linkage employed by a toggle machine provides platen parallelism. This is particularly important in multi-cavity molding.

Referring again to FIG. 3, the platen assembly 30', includes a stationary mold platen 31, a movable mold platen 32; and a clamp toggle platen 33'. The platens 31–33' are mechanically linked by a set of tie bars 30b. The stationary platens 31 and 33' are rigidly connected to the tie bars 30b, and the movable platen 32 is slidably connected to the tie bars 30b between platens 31 and 33'.

Extending between the stationary toggle platen 33' and the movable mold platen 32 are two pairs of clamp toggle members 34. The pivot points formed by associated clamp members are spanned by a clamp crosshead assembly 34c which is acted on by the piston of cylinder 37. When the hydraulic unit 37 elongates, the associated clamp members 34 approach alignment. This causes the movable mold platen 32 to approach the stationary mold platen 31. Conversely, when the cylinder 37 shortens or contracts, the associated toggle members 34 pivotally collapse or "toggle" to withdraw platen 32 away from platen 31. Such toggle clamp emchanisms can generate well in excess of one hundred tons of clamp force, with 100–450 tonnage clamp machines being common. CNC programmable toggle clamp injection molding machines are readily available.

(a) Platen and Clamping Assembly Details

Figure 4A:
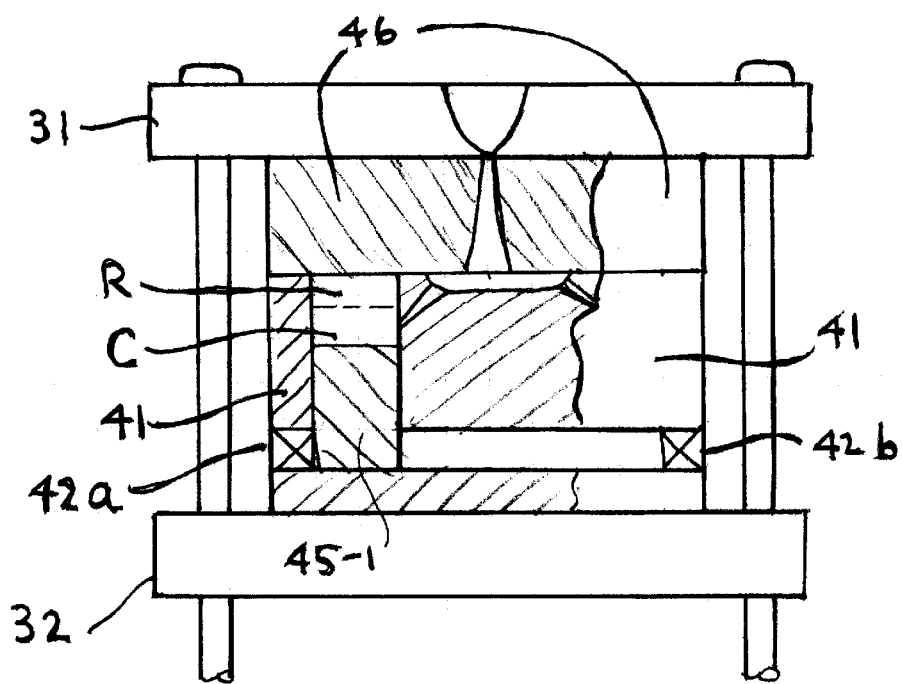
FIGS. 4A through 4C are diagrams showing stages of operation for the control mechanism used for gateless injection and pressurization in the system of FIG. 3.
Figure 4B:
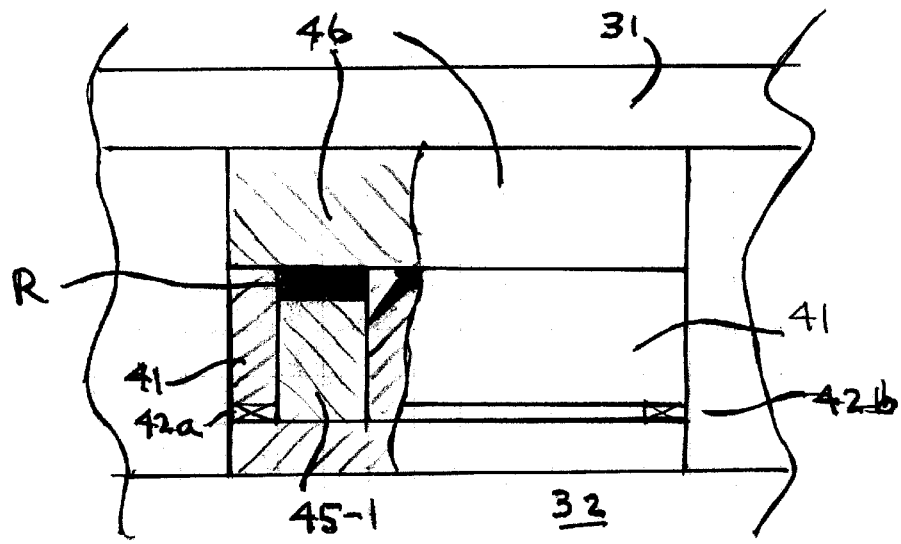
Figure 4C:
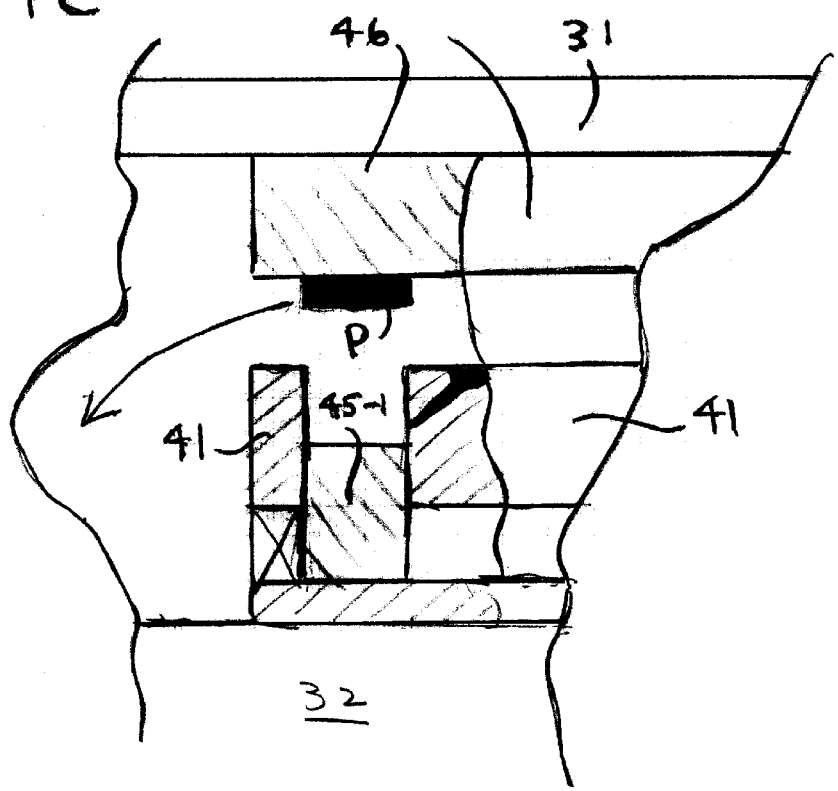

A more detailed presentation of the operation of the platen and clamping assembly 30', together with a cavity control mechanism 40 for a cold runner system with multiple cavities, is shown in FIGS. 4A through 4C. The clamp crosshead assembly, and other components in operative contact with the platen assembly 30', are omitted for the sake of clarity.

As previously noted, the platen assembly 30' includes stationary platens 31 and 33', and a movable mold platen 32. The movable mold-platen 32 can be precisely moved in relation to the stationary mold platen 31 under the supervision of controller 70.

Stationary mold platen 31 supports a mold member 46. The movable mold platen 32 supports a pair movable cores 45-1 and 45-2, of which only core 45-1 is shown. Surrounding the movable cores 45-1 and 45-2 is a cavity control frame 41, which is supported by resilient members 42a and 42b. Enlarged cavities C are formed between the cores 45-1 and 45-2, and the mold member 46.

It will be recognized that members 41-46, and their associated components which form the enlargable variable volume cavities C, could be supported alternatively by the stationary platen 31. Preferably, the resilient members 42 are associated with the movable platen 32.

In the cold runner system of FIGS. 4A–4C, the melt from the injection system 40 enters through the mold member 46 by a sprue 46s into a manifold 41m of the movable member 41. From the manifold 41m the melt enters a drop, such as the drop 41d into the cavity C below the reduced cavity R which demarks the lower boundary of the molded part in order to achieve the desired gateless molding.

The movable platen 32 also supports the ejector assembly 50 which has been discussed above. By virtue of the resilient members 42, the mold member 46 can be closed on the cores 45-1 and 45-2. It should be noted that the injection/pressurization molding system 10 and the platen assembly 30' can be used to mold a large variety of articles.

(b) Operation of the Alternative Embodiment

The various stages of injection and pressurization for the gateless molding afforded by the embodiment of FIG. 3 are shown in FIGS. 4A through 4C.

In FIG. 4A the cavity system is shown in its open position, with the rod 37r of the hydraulic cylinder 37 fully extended to form an enlarged cavity C within the mold. In FIG. 4B the contents of the mold have been fully pressurized to form the part in accordance with the invention. In FIG. 4C the mold has been opened to allow the molded part to be ejected.

III. The Mold Cavity

FIGS. 2A through 2C and 4A through 4C illustrate the relationship between a movable core, such as the core 25 of FIG. 2A and the cores 45-1 and 45-2 of FIG. 4A, and the receiving mold members 26 and 46.

The mold members 26 and 46 are supported by the stationary mold platen 31, whereas the moveable cores 25 and 45 are supported by the movable mold platen 32. As noted above, the invention contemplates the interchange, including sequenced and controlled relative motions and positions, of selected components between the platens 31 and 32. The mold members 26 and 46 supported by the stationary platen 31 preferably are made from high quality tool steel, other tool-grade metal alloys, or from glass or ceramics which possess a surface suitable for a molded product.

Venting gaps exist at the perimeter of the mold members 26 and 46. The venting gaps are sufficiently wide to prevent the escape of melt, while permitting gases to vent. The venting gaps are in communication with venting slots, which have larger dimensioned openings or clearances.

The embodiment in FIGS. 2A through 2C has a single-cavity, but a larger number of cavities can be employed as illustrated in FIGS. 4A through 4C.

The stationary mold member 46 is bored to form a continuous sprue. A sprue bushing is contained in the mold member and serves to precisely define and maintain the orifice size of the sprue and to seat against the nozzle of the molding machine. The sprue is in fluid communication with a runner system which carries the melt from a sprue radially to mold cavities, of which only a single cavity is shown in FIGS. 2A through 2C. Conventional gates interconnect runners and mold cavities.

Extending from the intersections of gates and runners are pressure relief ports. These ports terminate in excess polymer collection chambers. Conventional ejector pins selectively push solidified polymer out of the polymer collection chambers at appropriate times.

In a preferred embodiment, flow restrictive members can be adjusted to ensure that each mold cavity receives an appropriate amount of melt. The flow restrictive members extend into the runner system so as to adjustably impede the flow of melt to their respective mold cavities. The impedance presented by each flow restrictive member depends on the degree to which it is inserted into the gates.

The flow restrictive members are preferably adjustable. Desirably associated with each flow restrictive member is a cam with an inclined groove which holds captive an extension of the associated member, such that movement of the cam parallel to the parting plane causes movement of the flow restrictive member in a direction perpendicular to the parting plane. Each cam is preferably coupled to a shaft which extends through the stationary clamping plate to an adjustment knob. Thus, by rotating the knobs the postions of the individual flow restrictive members can be independently and precisely controlled.

Mold balancing is important when different configurations are being simultaneously molded, that is, when some parts have larger volumes than others, or have restrictive portions which present larger impedances to melt flow. The flow restrictive members are then adjusted to compensate for differences in mold cavities.

The platens and mold constituents can also include conventional coolant flow channels. Leader pins can extend from the surfaces of the molding members to register opposing members as the mold cavity closes, or is in a closed state.

A runner system is formed by registerd grooves in the surfaces of mold members. An optimal retention device serves to hold a mold member at a fixed distance relative to a platen throughout the part ejection cycle, so that their is positive ejection motion in both forward and return strokes. A suitable retention mechanism operates in response to the control system by hydraulic fluid entering and leaving the device through its feed line.

Figure 5A:
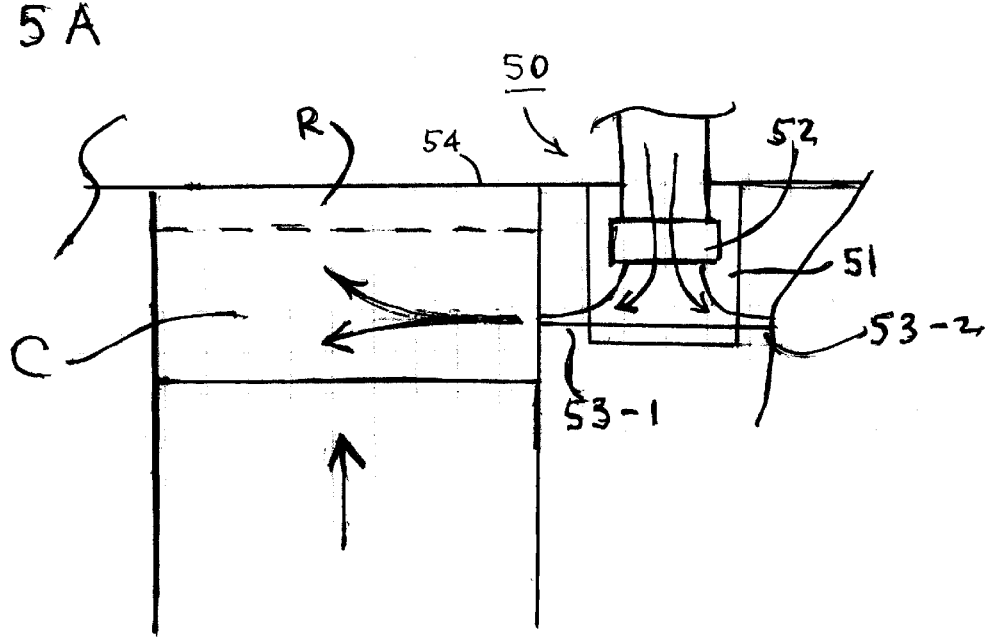
FIGS. 5A though 5C are diagrams of alternative cavity control mechanisms for gateless injection and pressurization molding.
Figure 5B:
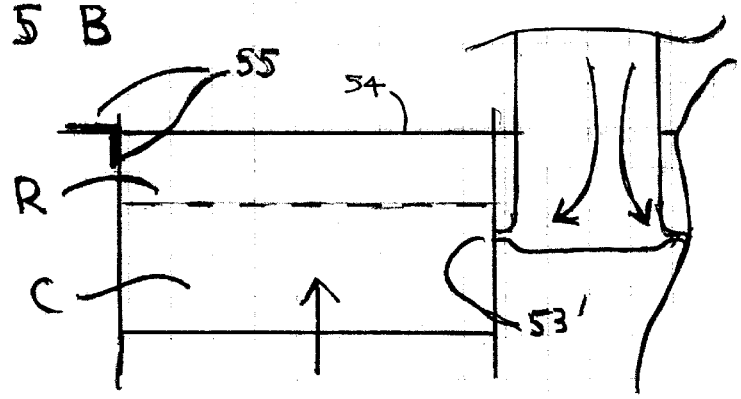
Figure 5C:
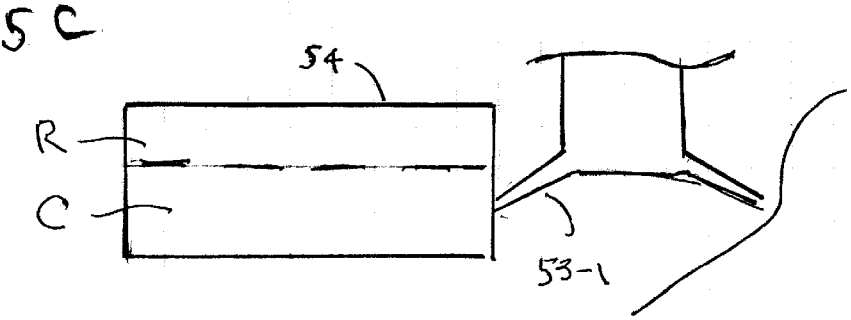

Other mold cavity arrangements in accordance with the invention are shown in FIGS. 5A–5C. In FIG. 5A a hot runner system 50 is used for the injection of melt below the final cavity R using an auxiliary well 51 containing a heater 52 to assure a hot melt condition for the injected plastic. As for the other embodiments of the invention, the final cavity R is above the injection port 53-1 and below the parting line 54 of the mold. The embodiment of FIG. 5A also permits injection into a companion mold cavity (not shown) similar to that provided in FIG. 4A, through a second injection port 53-2.

In FIG. 5B there is shown a hot edge gate with an injection port 53' below the final cavity R. Vacuum vents 55 are provided at the parting line 54 and along the wall of the final cavity R.

In FIG. 5C there is shown a multiple hot edge embodiment similar to that of FIG. 5A.

Other aspects of the invention will be readily apparent to those ordinary skill in the art.

What is claimed:

1. A method of forming a gateless article from a material using a molding machine, comprising the steps of:
    (a) forming a mold cavity having a first region for producing a molded part and a second, distinctive region including a gate for receiving said material;
    (b) injecting into said second region through a plurality of gates a volume of said material for the article to be formed in said first region of said mold cavity;
    (c) applying pressure to said material to move it beyond said gate from said second region into said first region; whereby said article does not have any gating marks; and
        wherein the volume of said second region is controlled by a movable insert of said machine.

2. The method of claim 1 wherein force maintained on said mold members until said article is completely formed without gating marks.

3. The method of claim 1 wherein said insert is displaced within said mold cavity while said mold cavity is completely closed.

4. The method of claim 1 wherein said insert is displaced below gate during the injection of said material.

5. The method of claim 4 wherein said gates terminate diagonal channels for the injection of said material Unto said mold.

6. The method of claim 1 wherein said mold has a parting line in said first region.

7. The method of claim 1 wherein the injection of said material is through a sidewall of said mold cavity.

8. A method of forming a gateless article from a material using a molding machine, comprising the steps of:
    (a) forming a mold cavity having a first region for producing a molded part and a second, distinctive region including a gate for receiving said material;
    (b) injecting into said second region through said gate a volume of said material for the article to be formed in said first region of said mold cavity;
    (c) applying pressure to said material to move it beyond said gate from said second region into said first region; whereby said article does not have any gating marks; and wherein the volume of said second region is controlled by a movable insert of said machine and the injection of said material is through a sidewall of said mold cavity with an edge-gate for a hot runner.

9. The method of claim 8 wherein said material is injected through the neck of a hot runner.

10. The method of claim 8 wherein said material is a plasticized resin.

11. Apparatus for forming a gateless article form a moldable material, comprising;
   (a) means for forming a mold cavity having a first region for producing a molded part and a second distinctive region for receiving said moldable material through a gate; and
   (b) means for injecting through said gate into said second region of a volume of material to be molded in said first region;
       wherein said cavity is formed by a first member in contact with a first platen and a second member mounted on a movable platen, said second member surrounds an insert mounted on said movable platen and said second member is spring loaded.

12. The method of forming a gateless article from a material using a molding machine having first and second mold platens, comprising:
   (a) forming a mold cavity having a first region adjoining a second region containing a gate for the injection of said material into said second region;
   (b) injecting into said second region a volume of material through said gate; and
   (c) forcing said material from said second region into said first region beyond said gate;
       whereby said material forced into said first region does not have any gating marks;
       wherein the injection of said material is through an edge-gate for a hot runner and is through a sidewall of said mold cavity.

13. The method of claim 12 wherein the injection of said material is through a sidewall of said mold cavity.

14. The method of claim 12 wherein said material is injected through the neck of said hot runner.

15. The method of claim 12 wherein said material is a plasticized resin.

* * * * *